(12) United States Patent
Kawaguchi

(10) Patent No.: US 9,016,616 B2
(45) Date of Patent: Apr. 28, 2015

(54) FLYING OBJECT

(76) Inventor: Hiroshi Kawaguchi, Habikino (JP)

( * ) Notice: Subject to any disclaimer, the term of this patent is extended or adjusted under 35 U.S.C. 154(b) by 783 days.

(21) Appl. No.: 13/190,040

(22) Filed: Jul. 25, 2011

(65) Prior Publication Data

US 2012/0022721 A1    Jan. 26, 2012

Related U.S. Application Data

(60) Provisional application No. 61/370,348, filed on Aug. 3, 2010.

(30) Foreign Application Priority Data

Jul. 26, 2010 (WO) .................. PCT/JP2010/062547

(51) Int. Cl.
 *B64C 29/00* (2006.01)
 *B64C 29/02* (2006.01)

(52) U.S. Cl.
 CPC ..................... *B64C 29/02* (2013.01)

(58) Field of Classification Search
 USPC ............ 244/3.24, 6, 7 R, 7 B, 35, 7 A, 17.11, 244/17.21, 17.23, 17.25, 10, 21
 See application file for complete search history.

(56) References Cited

U.S. PATENT DOCUMENTS

| | | | |
|---|---|---|---|
| 5,114,096 A * | 5/1992 | Wernicke ...................... | 244/7 B |
| 5,289,994 A * | 3/1994 | Del Campo Aguilera .... | 244/7 B |
| 5,295,643 A | 3/1994 | Ebbert et al. | |
| 5,419,514 A | 5/1995 | Ducan | |
| 5,746,390 A | 5/1998 | Chiappetta | |
| 6,502,787 B1 | 1/2003 | Barrett | |
| 6,604,706 B1 * | 8/2003 | Bostan .............................. | 244/6 |
| 8,505,846 B1 * | 8/2013 | Sanders, II .................... | 244/7 R |
| 2002/0074452 A1 * | 6/2002 | Ingram ......................... | 244/7 B |
| 2006/0121818 A1 | 6/2006 | Lee et al. | |

FOREIGN PATENT DOCUMENTS

| | | |
|---|---|---|
| JP | 4-5199 | 1/1992 |
| JP | 5-39092 | 2/1993 |
| JP | 6-293296 | 10/1994 |
| JP | 7-232699 | 9/1995 |
| JP | 11-217099 | 8/1999 |
| JP | 2005-533700 | 11/2005 |
| JP | 2006-327219 | 12/2006 |
| JP | 2007-118891 | 5/2007 |
| JP | 2007-521174 | 8/2007 |

(Continued)

OTHER PUBLICATIONS

International Search Report mailed Aug. 17, 2010, in PCT/JP2010/062547, filed Jul. 26, 2010 (with English language translation of categories of cited documents).

*Primary Examiner* — Benjamin P Lee
(74) *Attorney, Agent, or Firm* — Oblon, McClelland, Maier & Neustadt, L.L.P.

(57) ABSTRACT

By using the interaction between the wind flow and the stabilizer arranged in the wind flow and along the direction of the wind flow, this invention provides the flying object that secures the stability of device or aircraft or stabilizer itself unified with the stabilizer by above effect. The interaction mentioned above is that when the wind flow hits the stabilizer at a certain angle, the wind flow changes the direction, and the power corresponding its reaction is given to the stabilizer by its reaction.

16 Claims, 7 Drawing Sheets

(56) References Cited

FOREIGN PATENT DOCUMENTS

| | | |
|---|---|---|
| JP | 2008-230475 | 10/2008 |
| JP | 2010208501 A * | 9/2010 |
| WO | WO 00/15497 | 3/2000 |
| WO | WO 2006/093641 A2 | 9/2006 |
| WO | WO 2009/096010 A1 | 8/2009 |
| WO | WO 2009/096048 A1 | 8/2009 |
| WO | WO 2009/096058 A1 | 8/2009 |

* cited by examiner

F I G . 3
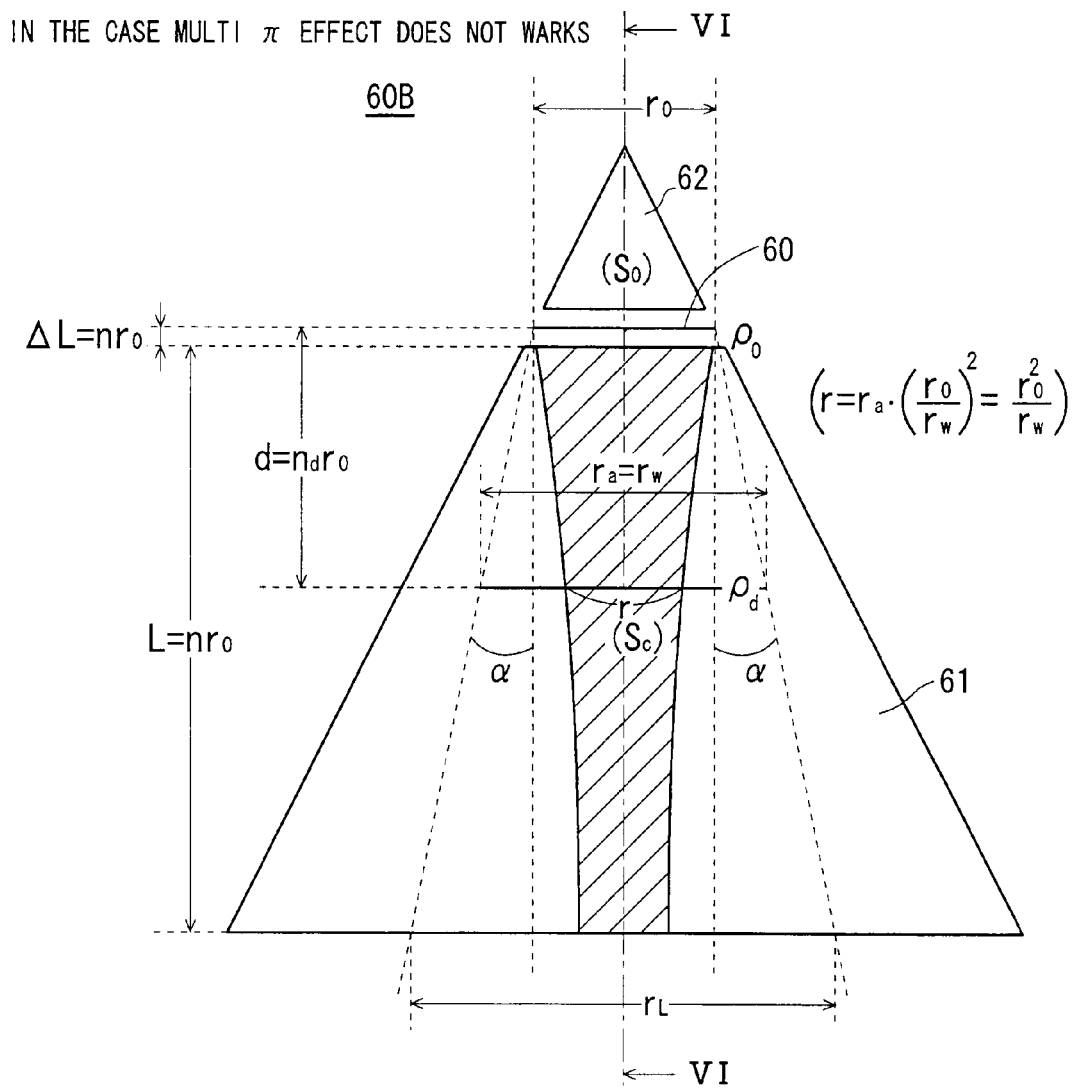

FLYING OBJECT

BACKGROUND OF THE INVENTION

1. Field of the Invention

This invention relates to flying objects and can be applied to flying objects with a propeller that can make stable vertical takeoffs, landings, and hovering and to it's technology.

2. Description of the Background Technology

At present, there are helicopters and similar aircrafts (ex. V-22 combat plane of the United States Army that applies the tilt-rotor system) that can make VTOL (Vertical Take Off and Landing) and Hover, besides the F-35B, combat plane of the United States Army, that applies variable nozzle which can change the angle of their nozzle. All of these aircrafts need a very high level control technique and besides it is essential for these aircrafts to be controlled by high level sensors and a high speed computer. For these reasons, the body weight increases and production cost also increase, and it has been almost impossible to apply these technologies to regular airplanes.

Under these circumstances, if some good solution for the above problems are found, we can expect great progress in the aviation field.

Incidentally, Japanese Published Unexamined Application No. 1992-5199, Japanese Published Unexamined Application No. 1994-293296, Japanese Published Unexamined Application No. 2006-327219, Japanese Published Unexamined Application No. 2007-118891, Japanese Unexamined Patent Application Publication No. 2005-533700, Japanese Unexamined Patent Application Publication No. 2007-521174, Japanese Published Unexamined Application No. 1993-39092, and Japanese Published Unexamined Application No. 1995-232699, have already been published as the preceding technical document related to the background technology of this invention.

Aircrafts developed so far, have had such problems that the instability becomes bigger by the wind flow which the aircraft generates. Because of other unstable elements such as the vibration of the body caused by the rotational vibration of the rotator (propeller), the staggering of the body caused by the side wind, the ability to secure the stability of the aircraft when the aircraft is making vertical take off, landing and hovering, has still been a very serious problem until now.

SUMMARY OF THE INVENTION

The purpose of this invention is to provide flying objects with outstanding stability by supplying flying objects with a propeller that can make stable vertical take offs, landings, or stable hovering.

The flying object of the first aspect of this invention is that the radial stabilizing wing is arranged as a relationship between the vertical distance $n_{GC}$ between the center point of the total wind flow pressure obtained by synthesizing the center point of the wind flow pressure of the respective stabilizing wings and the center of gravity of the concerned flying object, and the vertical distance $n_{GW}$ between the center point of outside wind pressure and the center of gravity of the flying object is represented by formula (26).

According to this aspect, the concerned flying object can hover stably.

The flying object of the second aspect of this invention is that the radial stabilizing wing is arranged as the relationship between the vertical distance $n_{GC}$ between the center point of the total wind flow pressure obtained by synthesizing the center point of the wind flow pressure of the respective stabilizing wings and the center of gravity of the concerned flying object, and the vertical distance $n_{GW}$ between the center point of outside wind pressure and the center of gravity of the flying object is represented by formula (26).

According to this aspect, the concerned flying object can hover stably.

The flying object of the third aspect of this invention is that the radial stabilizing wing is arranged as the relationship between the vertical distance $n_{GC}$ between the center point of the total wind flow pressure obtained by synthesizing the center point of the wind flow pressure of the respective stabilizing wings and the center of gravity of the concerned flying object, and the vertical distance $n_{GW}$ between the center point of outside wind pressure and the center of gravity of the flying object is represented by formula (26), besides, is arranged as that the relation between minute part of each stabilizing wing and the center of gravity is represented by formula (28).

According to this aspect, the concerned flying object can hover stably.

The flying object of the fourth aspect of this invention is that the radial stabilizing wing is arranged as the relationship between the vertical distance $n_{GC}$ between the center point of the total wind flow pressure obtained by synthesizing the center point of the wind flow pressure of the respective stabilizing wings and the center of gravity of the concerned flying object, and the vertical distance $n_{GW}$ between the center point of outside wind pressure and the center of gravity of the flying object is represented by formula (26), besides, is arranged as that the relation between minute part of each stabilizing wing and the center of gravity is represented by formula (29).

According to this aspect, the concerned flying object can hover more stably.

The flying object of the fifth aspect of this invention is that the cylindrical stabilizing wing is arranged as the relationship between the vertical distance $n_{GC}$ between the center point of the total wind flow pressure obtained by synthesizing the center point of the wind flow pressure of the respective stabilizing wings and the center of gravity of the concerned flying object, and the vertical distance $n_{GW}$ between the center point of outside wind pressure and the center of gravity of the flying object is represented by formula (26).

According to this aspect, the concerned flying object can hover stably. The flying object of the sixth aspect of this invention is that cylindrical stabilizing wing is arranged as the relationship between the vertical distance $n_{GC}$ between the center point of the total wind flow pressure obtained by synthesizing the center point of the wind flow pressure of the respective stabilizing wings and the center of gravity of the concerned flying object, and the vertical distance $n_{GW}$ between the center point of outside wind pressure and the center of gravity of the flying object, is represented by formula (26), besides, is arranged as that the relation between minute part of each stabilizing wing and the center of gravity is represented by formula (34).

According to this aspect, the concerned flying object can hover more stably.

The flying object of the seventh aspect of this invention is the flying object comprises the aircraft described in any one of claims 1 to 4 and the aircraft described in claim 5 or claim 6, and wherein the flying object has a cross shape stabilizing wing and a cylindrical stabilizing wing and the wings share one wind flow generating device.

According to this aspect, the concerned aircraft can hover stably.

The flying object of the eighth aspect of this invention is the flying object comprising two or more of the same flying objects described in any one of claims 1 to 7, which are arranged at intervals with central axes thereof being parallel to each other and each has an upwardly directed intake and a downwardly directed exhaust, and a connecting member that connects said two or more of the same flying objects to each other.

According to this aspect, the concerned flying object can hover more stably.

BRIEF DESCRIPTION OF THE DRAWINGS

FIG. 3 is a drawing for explaining propeller aircraft 60B (when multiple π effect does not work) concerning Embodiment 1.

DESCRIPTION OF THE PREFERRED EMBODIMENTS

It has been learned during many experiments that the source of the lifting power is the effect of action and reaction of wind flow against the wing. It has been succeeded to make clear the relationship between the power that the propeller wind affects each stabilizing wing, and the wind pressure power by the air around the aircraft, by making small aircrafts (a model, controllable by radio control) that have the delta wing drawn in FIG. 1 and FIG. 3 or the cylindrical stabilizing wing (duct wing) in FIG. 7, and by repeating hovering experiments by remote controlling with radio control.

Figure 1:
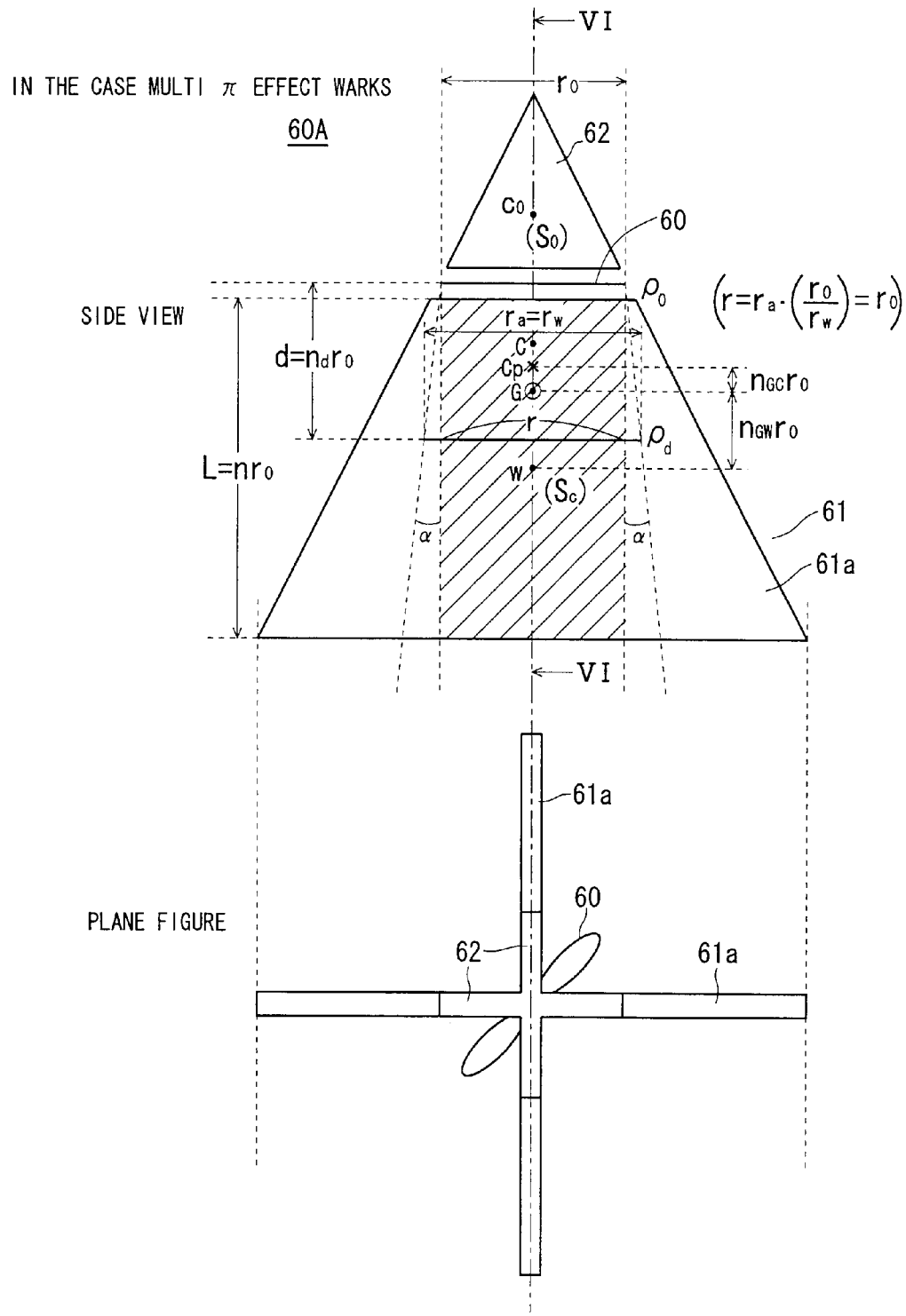
FIG. 1 is a plane figure and side view of propeller aircraft 60A for explaining propeller aircraft 60A (when multiple π effect works) concerning Embodiment 1.
Figure 2:
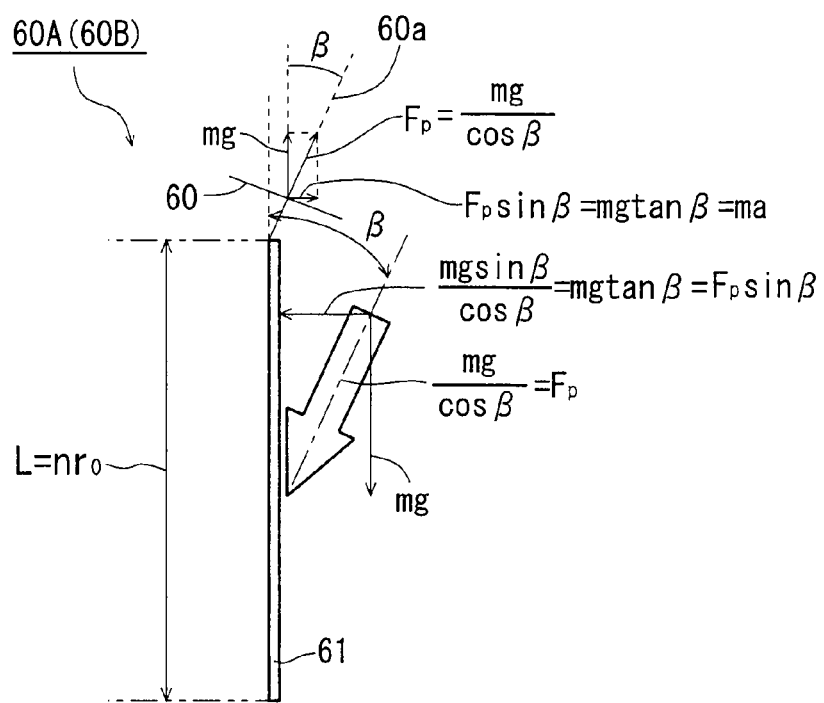
FIG. 2 is a drawing which explains the Theory of New Lifting Power.

FIG. 2 is the drawing that explains the theory of New Lifting Power, and is the cross sectional view VI-VI in FIG. 1 and FIG. 3. Here, suppose that aircraft 60A(60B) is holding the weight mg of the aircraft and hovering. $F_p$ in FIG. 2 represents the thrust of propeller 60, β is the angle of the vibration of the top-end of the rotational axis of propeller 60a. And the mark a ($=g \tan β$) represents the acceleration of the aircraft 60A(60B) that is going to start moving horizontally by slanting of the propeller thrust $F_p$ at angle β, when the top of the rotational axis of propeller 60a vibrates at angle β.

The vibration of the rotational axis of propeller 60A is rotating in all directions and the vertical element of thrust $F_p$ is holding the weight of the aircraft 60A(60B). Consequently, the wind power that blows downward from propeller 60, flows down along stabilizing wing 61 of aircraft 60A(60B) with the power of average mg. At this moment, the aircraft 60A(60B) begins to move horizontally at accelerate a. So, the wind that flows downward with power mg hits the stabilizing wing 61 of aircraft 60A(60B) at angle β as FIG. 2.

At this moment, it is cleared that the power $F_p \sin β$ is applied to the horizontal line located at any distance d from propeller 60 on the stabilizing wing (the part of stabilizing wing which is located inside of dotted line that represents the spread of propeller wind that spreads at angle α from propeller 60 in FIG. 1 or 3) within the range where propeller wind is flowing. The wind pressure power from the propeller wind towards the entire stabilizing wing (called propeller wind pressure hereafter) is $F_C$, according to dynamics, $F_C$ should be $L F_p \sin β$, but it is learned that the actual value of the power $F_C$ is represented by formula (1) or formula (2), by the analysis of the hovering experiments with the aircraft in FIG. 1 and FIG. 3. Here, $r_0$ represents the diameter of propeller 60, and n is a multiple coefficient of height L of a trapezoid wing arranged under propeller 60 of the aircraft in FIG. 1, for the diameter of propeller $r_0$. $S_C$ represents the area of the diagonal part in FIG. 1 or FIG. 3.

In the case of the aircraft in FIG. 1 (when the value of the L is relatively small)

$$F_C = n\pi F_P \sin β = \frac{S_C}{r_0^2} \pi F_P \sin β \qquad (1)$$

In the case of the aircraft in FIG. 3 (when the value of L is relatively big)

$$F_C = \frac{S_C}{r_0^2} F_P \sin β \qquad (2)$$

The difference between formula (1) and formula (2) is whether it has π or not.

In accordance with the height L of the stabilizing wing underneath the propeller, the π coefficient may or may not appear. As a result of the experiments in which the value of L is changed, the value of multiple coefficient n of L which is the boundary between appearing and disappearing of the π coefficient has some range. When the value of multiple coefficient n of L is about 2.4 or less, it seems that π coefficient appears. Also, when the value of multiple coefficient n of L is 3.0 or more, it seems that π coefficient disappears. Hereafter it is called multiple π effect when π coefficient is appearing, and it is called 1 multiple effect_when π coefficient is not appearing.

The calculation of area $S_C$ is to convert the area of the stabilizing wing inside the propeller wind into the area of the stabilizing wing inside of propeller wind when the spreading propeller wind is shrunk into the condition that it does not spread at all (the condition that propeller wind flows without changing the air density directly under the propeller as parallel flow). But the calculation is different between the case of FIG. 1 (L is relatively small) and the case of FIG. 3 (L is relatively big). In the case of FIG. 1, it is calculated as the way of spreading the propeller wind on the stabilizing wing in two dimensional spreading on the stabilizing wing. In the case of FIG. 3, it is calculated as the way of spreading the propeller wind in three dimensional spreading. The concrete way of calculating is as follows.

Suppose horizontal line on the stabilizing wing is located at a place any distance d from propeller 60. $r_W$ represents the width of the spreading of the propeller wind on said horizontal line, and ra represents the width of the stabilizing wing inside of propeller wind (in the case FIGS. 1 and 3, $r_w=r_a$), and also, r represents the width of the stabilizing wing on said horizontal line after shrinking, the formulas will be (3), (4).

In the case of the aircraft in FIG. 1 (when multiple π effect works) (in the case of FIG. 1, $r_a=r_w$)

$$r = r_a\left(\frac{r_0}{r_w}\right) = r_0 \quad (3)$$

In the case of the aircraft in FIG. 3 (when multiple π effect doesn't work) (in the case of FIG. 3, $r_a=r_w$)

$$r = r_a\left(\frac{r_0}{r_w}\right)^2 = \frac{r_0^2}{r_w} \quad (4)$$

As mentioned above, after drawing the shrinking drawing of the stabilizing wing inside of propeller wind, the center point of propeller wind pressure $C_p$ should be obtained. When the multiple π effect works, the center point of propeller wind pressure, as known before, appears at the place removed below from the front end of the stabilizing wing of said shrinking drawing of the stabilizing wing by ¼ length of the wing chord of the shrinking stabilizing wing. But, when multiple π effect doesn't work, the existing theory of Lifting Power doesn't work, and the normal center point of outside wind pressure for the stabilizing wing of said shrinking drawing of the stabilizing wing drawn by using formula (4) which is considered that the air density is becoming thinner as the propeller wind spreads three dimensionally, becomes the center point of the propeller wind pressure.

Usually, under the condition that there is no stabilizing wing under the propeller, the spreading angle of propeller wind a will be around 0.2~0.24, and is represented by tan α. When the aircraft is like the one in FIG. 1 (the air craft that has relatively small L), tan α is around 0.08~0.12. When the aircraft is like the one in FIG. 2 (the aircraft that has relatively big L), it has been confirmed by experiments that tan α is around 0.2~0.24.

This phenomenon is considered as that when a stabilizing wing which has relatively small value of L is existing inside of the propeller wind, the spreading of propeller wind is controlled to some extent by Coanda effect. As the value of L becomes bigger, the spreading degree of propeller wind becomes bigger, and when the spreading degree of propeller wind becomes bigger than a certain degree near the lower area of stabilizing wing, the air density near the lower area of stabilizing wing becomes small and the air flow on the stabilizing wing will be peeled off. Once this kind of peeling off condition happens at the lowest part of stabilizing wing, the peeling off condition seems to affect the top of the stabilizing wing.

Now, in FIG. 2, suppose that the case is that the top of rotational axis of propeller 60a is not slanting in all directions, but in only one direction at angle β. Additionally, suppose it is the case that aircraft 60A in FIG. 1 is flying horizontally, the $F_p$ in formula (1) is considered the thrust in the horizontal direction of said aircraft 60A, and angle β is considered the angle that the main wing 61 of the aircraft 60A is slanting to the direction of movement, that is to say, an attack angle of main wing 61, then formula (1) is surely considered the Formula of Lifting Power.

Regarding formula (2) related to the aircraft in FIG. 3, it is different from the regular lifting power because the multiple π effect is not applicable but is the lifting power under the special circumstance.

In general, airplane with fixed wing gets lifting power by moving horizontally. It is considered that the condition that the fixed wing of this kind of airplane is moving horizontally in the air with attack angle, and the condition that the aircraft 60A in which stabilizing wing 61 is arranged along the rotational axis of propeller 60a is beginning to move horizontally by the vibration of the rotational axis of propeller 60a during hovering, is the same with regard to the power towards each fixed wing of the airplane and stabilizing wing of aircraft 60A. It is also considered that formula (1) is the formula which represents lifting power, by the thrust power which is a completely different element from an old one, and by square multiple coefficient of diameter roof propeller 60.

In the experiments of hovering with many kinds of aircrafts, an important condition for making the aircraft hovering stably was discovered, besides the above new theory of lifting power was established. This means that it is impossible to make stable hovering unless the center of gravity G is arranged at the point where line segment $C_pW$ is divided by calculating proportionally according to the size of each wind pressure power towards the action center point of propeller wind pressure power by the propeller wind onto the stabilizing wing arranged under the propeller of hovering aircraft (called center point of propeller wind pressure hereafter) $C_p$, and towards the action center point of regular wind pressure power from the side by the still air around the aircraft (called center point of outside wind pressure hereafter) W.

Here, suppose the regular wind pressure power from the side by the still air around the aircraft against propeller wind pressure power $F_c$, is represented by $F_W$. The relationship between $F_C$ and $F_w$ is obtained by experiments, and becomes formula (5), and formula (6).

In the case of the aircraft in FIG. 1 (when the value of L is relatively small (when multiple π effect works))

$$F_W = \frac{W}{n\pi}F_C = \frac{W}{\frac{S_C}{r_0^2}\pi}F_C = WF_P\sin\beta \quad (5)$$

In the case of the aircraft in FIG. 3 (when the value of L is relatively big (when multiple π effect does not work))

$$F_W = \frac{W}{\frac{S_C}{r_0^2}}F_C = WF_P\sin\beta \quad (6)$$

Here, W is represented by formula (7) when the projected area of the aircraft is represented by $S_W$.

$$W = \frac{S_W}{S_C} \quad (7)$$

Here again, when $n_{GC}$ represents multiple coefficient of the vertical distance between the center point of propeller wind pressure $C_p$ and the center of gravity G for the diameter of propeller $r_0$, and when $n_{GW}$ represents the multiple coefficient of vertical distance between the center point of outside wind pressure W and G for the diameter $r_0$, the formula (8), and (9) are held.

$$\frac{F_C}{F_W} = \frac{n\pi}{W} = \frac{\frac{S_C}{r_0^2}\pi}{W} = \frac{n_{GW}}{n_{GC}} \quad (8)$$

(when multiple π effect works)

$$\frac{F_C}{W_W} = \frac{\frac{S_C}{r_0^2}}{W} = \frac{n_{GW}}{n_{GC}} \quad (9)$$

(when multiple π effect doesn't work)

Here, let $S_C/r_0^2 = H_C$, then formula (10) and (11) are held $$H_C \pi n_{GC} = W n_{GW} \text{ (when multiple π effect works)} \quad (10)$$

Or $$H_C n_{GC} = W n_{GW} \text{ (when multiple π effect doesn't work)} \quad (11)$$

Hereafter this $H_C$ is called wind flow pressure coefficient.

The aircraft can make stable hovering if it is planned as formula (10), (11), the conditional formulas for stable hovering, are satisfied. Of course, the calculated value of the position of the center of gravity on the main wing viewed from the front of the aircraft has to correspond with the calculated value of the position of the center of gravity on the side wing viewed from the side of the aircraft.

The unstable element of the hovering aircraft is not only that the propeller wind pressure power $F_C$ applied to said center point of propeller wind pressure $C_p$ and the outside wind pressure power $F_W$ applied to the center point of outside wind pressure $F_W$, are not balanced against the center of gravity, but also that there exists another big unstable element. As explained in FIG. 2, the rotational axis of the propeller always vibrates with a certain angle big or small, and this vibration is rotating in all directions. This condition is unpreventable. Because of this circumstance, the vibration of the aircraft is becomes gradually bigger, until it becomes uncontrollable.

The method to prevent the vibration of the aircraft caused by the vibration of rotational axis of propeller is to use each wind pressure moment by propeller wind pressure power $F_C$ applied to the aircraft, and outside wind pressure power $F_W$, for the center of gravity G.

Figure 4:
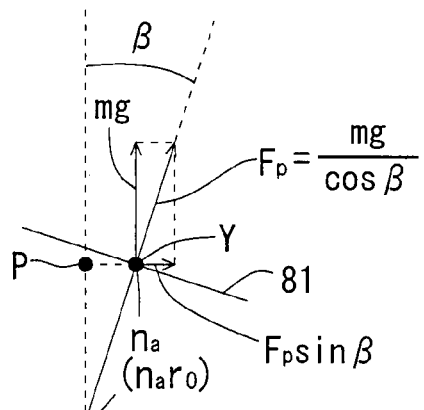
FIG. 4 is a drawing which explains the condition to offset and stabilize the influences caused by the vibration of the rotational axis of the propeller.
Figure 4:
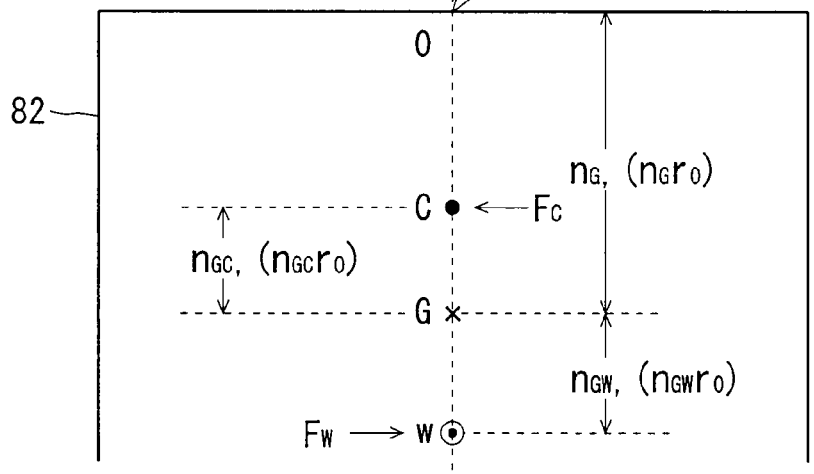

FIG. 4 is explains how to arrange the center point of propeller wind pressure $C_p$ and the center point of outside wind pressure W in order to prevent the vibration of the aircraft caused by the vibration of rotational axis of the propeller. Suppose propeller 81 and stabilizing wing 82 under it are arranged on aircraft 80 in FIG. 4, and now the concerned aircraft is hovering with the condition that the weight of the aircraft mg and the vertical element of thrust power $F_P$ of propeller 81 are balanced against each other. FIG. 4 shows the moment when the rotational axis of propeller is slanting at angle β against the vertical line. At this moment, the aircraft is in a condition that it is drawn to the direction that propeller 81 is slanting with the power $F_P \sin \beta$, the aircraft starts rotating around the center of gravity G of rotating center, but at this moment, propeller wind pressure power $F_C$ and outside wind pressure power $F_W$ works as the moment of opposite direction against the direction the aircraft is going to rotate, and if the total moment of $F_C$ and $F_W$ is bigger than the moment of $F_P \sin \beta$, then the rotating of the aircraft stops. When this condition is represented by the moment balance formula it becomes formula (12), provided that the multiple coefficient of the vertical distance from the fixed point of rotational axis of the propeller to the center of gravity G for the diameter of propeller $r_0$ is $n_G$, and the multiple coefficient of the distance from the fixed point of rotational axis of propeller to the top of rotational axis of propeller for the diameter of the propeller $r_0$ is $n_a$.

$$n_{GC} F_C n_{GW} F_W + m g n_a \sin \beta \geq F_P \sin \beta (n_a \cos \beta + n_G) \quad (12)$$

According to FIG. 2, $F_P = mg/\cos \beta$, $F_C = H_C \pi mg \tan \beta$, $F_W = W mg \tan \beta$, so, putting the above formulas into formula (12), then formulas (13), (14), are given.

$$H_C n_{GC} + W n_{GW} n_G \text{ (when multiple π effect works)} \quad (13)$$

Or $$H_C n_{GC} + W n_{GW} \geq n_G \text{ (when multiple π effect doesn't work)} \quad (14)$$

As above, to hold formulas (10), (11), (13), and (14), is the condition needed for the aircraft to make stable hovering. However, formulas (13) and (14) are not precise. It is simplified for explaining simply the method to prevent the vibration of the aircraft from the vibration of rotational axis of propeller.

Actually, there has been many aircrafts with condition $n_{GC} = n_{GW} = 0$, in other words, even the aircraft, which is planned as the center point of propeller wind pressure $C_p$, the center point of outside wind pressure W, and the center of gravity G are corresponded each other, can make stable hovering. The value of $n_G$ of these aircraft are enough bigger than 0, and $H_C n_{GC} + W n_{GW}$ is of course 0. This shows that formula (13), (14) is not held.

As above, the reason why the aircraft with condition $n_{GC} = n_{GW} = 0$ can make stable hovering is that the calculation of moment by the wind pressure around the center of gravity should not be calculated only by the distance between the center point of wind pressure and the center of gravity, it should be calculated as the total sum of minute moment around the center of gravity brought by the wind pressure of all the minute part of the wing like the calculation of the moment of inertia. Considering this circumstance and rewrite formulas (13) and (14), they become formula (15) and (16). Provided, let the area of each minute part of the stabilizing wing after shrinking inside of the propeller wind be $S_{ci}$, the area of each minute part of projection area of the aircraft be $S_{wk}$, and each multiple coefficient of the vertical distance between each minute part and the center of gravity G of the aircraft for the diameter of the propeller $r_0$ be $n_{GCi}$, $n_{GWk}$, furthermore, let $H_{ci} = S_{ci}/r_0^2$.

$$\pi \sum_i H_{Ci} n_{GCi} + \frac{W}{S_W} \sum_k S_{Wk} n_{GWk} \geq n_G \quad (15)$$

(when multiple π effect works)

Or $$\sum_i H_{Ci} n_{GCi} + \frac{W}{S_W} \sum_k S_{Wk} n_{GWk} \geq n_G \quad (16)$$

(when multiple π effect doesn't work)

As mentioned above, it is clear that the basic condition of stable hovering of the aircraft is to let formulas (10) and (11), and formulas (15) and (16) be satisfied.

The first reason of making the hovering aircraft unstable was because the center point of propeller wind pressure $C_p$ did not correspond with the center point of outside wind pressure W, and the second reason was because of the vibration of the rotational axis of the propeller. It is clear that the method of preventing the vibration of the aircraft caused by each reason is to plan the aircraft to satisfy the formula (10), (11), and the formula (15), (16). But it is also very important to consider that the flow of the air shows unexpected move by Coanda effect, and the effect to the aircraft by the flow of the air around the propeller besides the propeller wind.

Figure 5:
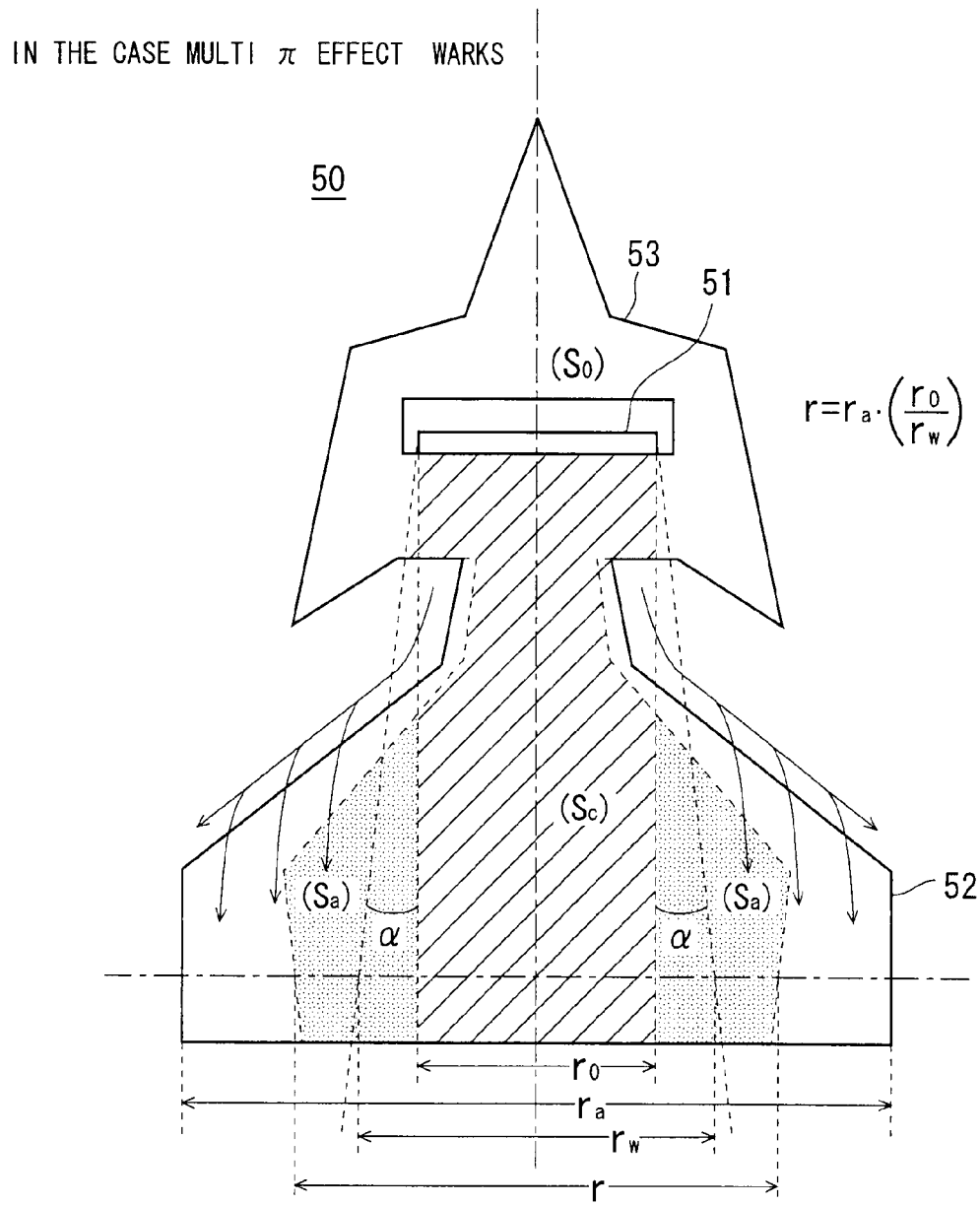
FIG. 5 is a drawing which describes the situation that the propeller wind is flowing along the hem of the lower stabilizing wing.

FIG. 5 shows the flow of the propeller wind out along the hem of lower part of stabilizing wing towards the outside of the spread of regular propeller wind by Coanda effect. In this kind of case, it is impossible to get correct results by calculating the position of the center of gravity with the one basic calculation mentioned before.

The basic calculation, for example, in the case of FIG. 1 since the calculation of the area of the stabilizing wing inside of the propeller wind $S_C$ is calculated with the image that the real shape of stabilizing wing existing in the actual propeller wind shrinks at the same time when the spreading angle $\alpha$ of the propeller wind shrinks into 0, as a result, the shape of the stabilizing wing in the spreading propeller wind becomes rectangle with width $r_0$ after calculation of shrinking. The area of this rectangle becomes Sc. And also the center point of propeller wind pressure of this rectangle stabilizing wing becomes the actual center point of propeller wind pressure of the aircraft $C_p$. But in the case of FIG. 5, since there is some exceeding flow from the normal flow, so the shape of the stabilizing wing of this exceeding flow part has to be shrunk by the same calculating formula. The diagonal part in FIG. 5 is the shape after the shrink calculation of the stabilizing wing inside of the spreading propeller wind by the basic calculation. The shape of its exceeding part of the stabilizing wing after the shrink calculation is the shaded part in FIG. 5. Hence the value given by the addition of the area of stabilizing wing $S_C$ inside of shrinking propeller wind after the basic shrink calculation to the area of this shadow Sa should be the total area of stabilizing wing after shrinking. When this total area of stabilizing wing after shrinking is represented by $[S_C]$, then formula (17) is given.

$$[S_C] = S_C + S_a \quad (17)$$

Figure 6:
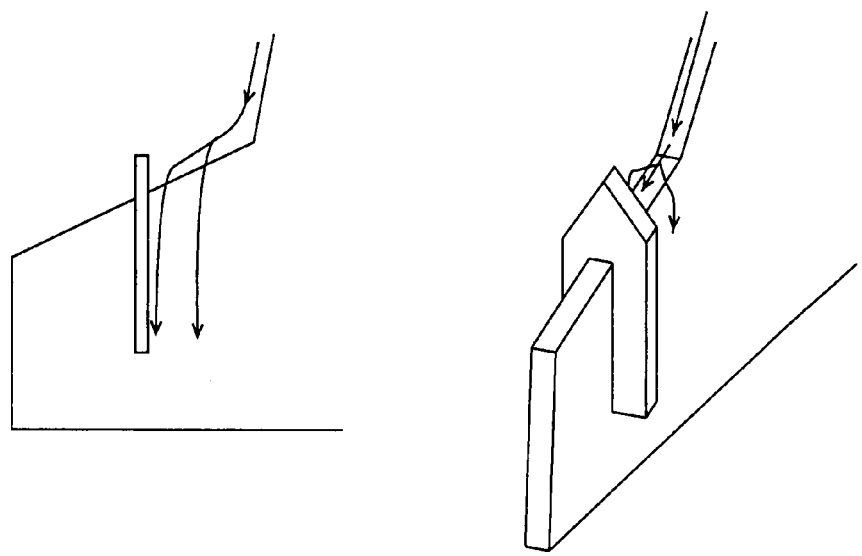
FIG. 6 is a drawing which describes the method to stop the exceeding propeller wind flowing along the hem of the lower stabilizing wing.

The method to prevent the exceeding of propeller wind is shown in FIG. 6. As FIG. 6, it is to arrange the stopper at the middle of the hem of the stabilizing wing along which the exceeding wind is flowing. The actual experiment was done with an aircraft 50 like the one in FIG. 5. The exceeding wind was blocked completely by placing the stopper, consequently the anti-torque offsetting power of whole aircraft decreased and aircraft 50 started rotating into reverse. The center point of total wind flow pressure of whole aircraft 50 at that time moved further up than before placing the stopper, so it goes without saying, that the center of gravity to balance the aircraft also moved up.

In FIGS. (1), (3), and (5), regarding aircraft 60(A) and 60(B), the triangle upper stabilizing wing is arranged above propeller 60, and the upper part of the stabilizing wing is like the shape of Kabuto (Japanese helmet for samurai) is arranged around propeller 51 of the aircraft 50. These upper stabilizing wings were arranged to improve the stability of the aircraft during hovering, but at the beginning of the experiment, it was meant only to adjust the position of center point of outside wind pressure W. In repeating many experiments, it became clear that these stabilizing wings received the wind pressure more than outside wind pressure. Also it became clear that there was some delicate position gap between the calculated value of the position of the center of gravity that makes the aircraft stable and actual stabilizing position of the center of gravity, and according to the calculation with the size of the distance of the position gap, not only the outside wind pressure but also $1/\pi$ times the wind pressure by some wind flow were applied to these upper stabilizing wings (comparative multiple when multiple $\pi$ effect does not work and the propeller wind pressure is calculated as 1 time). And it was becoming cleared that the calculation of the center point of wind flow pressure by the wind flow of only these upper stabilizing wing was done by common calculation method of the center point of outside wind pressure.

The size of wind flow pressure of $1/\pi$ applying to the upper stabilizing wing except these outside wind pressure can be expressed as formula (18) if the size is represented by $F_0$. Provided let $S_0$ be actual area of upper stabilizing wing.

$$F_0 = \frac{1}{\pi}\left(\frac{S_0}{r_0^2}\right) F_P \sin\beta \quad (18)$$

It can be easily confirmed that there is air flow on the propeller absorbed into the propeller (called front air flow of propeller hereafter). It is clear that this absorbed air flow generates the wind pressure of $1/\pi$ as mentioned above. This kind of front air flow of propeller seems to spread around the propeller (including the below part from propeller) except the space where propeller wind is flowing, in some range (the range about 2 to 4 times of diameter of the propeller from the center point of rotation of propeller).

Now, formulas (19) and (20) are as below, besides total wind flow pressure coefficient is represented by [H], formulas (21) and (22) are expressed as below.

$$H_a = \frac{S_a}{r_0^2} \quad (19)$$

$$H_0 = \frac{S_0}{r_0^2} \quad (20)$$

$$[H] = \pi(H_C + H_a) + \frac{1}{\pi}H_0 \quad (21)$$

(when multiple $\pi$ effect works)

Or $$[H] = H_C + H_a + \frac{1}{\pi}H_0 \quad (22)$$

(when multiple $\pi$ effect does not work)

Also, when the value obtained by converting the area of the upper stabilizing wing $S_0$ into the shrunk area of the stabilizing wing inside of propeller wind, is added to the total area of stabilizing wing after shrinking $[S_C]$, formula (17) becomes formulas (23) and (24).

$$[S_C] = S_C + S_a + \frac{1}{\pi^2}S_0 \quad (23)$$

(when multiple $\pi$ effect works)

Or $$[S_C] = S_C + S_a + \frac{1}{\pi}S_0 \quad (24)$$

(when multiple $\pi$ effect does not work)

Hence, when the multiple coefficient of the projection area of the entire aircraft $S_W$ which is receiving the outside wind pressure, for the total area of stabilizing wing inside of propeller wind $[S_C]$, is represented by [W], [W] becomes formula (25).

$$[W] = \frac{S_W}{[S_C]} \quad (25)$$

As above, the formula of stable hovering condition of the aircraft which comprehends the exceeding of the propeller wind and the phenomenon of said front air flow of propeller, is as follows.

Formulas (10) and (11) becomes formula (26).

$$[H]n_{GC} = [W]n_{GW} \quad (26)$$

Formulas (13) and (14) becomes formula (27).

$$[H]n_{GC} + [W]n_{GW} \geq n_G \quad (27)$$

Formulas (15) and (16) becomes formula (28) and (29).

$$\pi \sum_i H_{Ci} n_{GCi} + \pi \sum_j H_{aj} n_{Gaj} + \frac{1}{\pi} \sum_m H_{0m} n_{G0m} + \frac{[W]}{S_W} \sum_k S_{Wk} n_{GWk} \geq n_G \quad (28)$$

(when multiple $\pi$ effect works)

Or $$\sum_i H_{Ci} n_{GCi} + \sum_j H_{aj} n_{Gaj} + \frac{1}{\pi} \sum_m H_{0m} n_{G0m} + \frac{[W]}{S_W} \sum_k S_{Wk} n_{GWk} \geq n_G \quad (29)$$

(when multiple $\pi$ effect does not work)

Provided that the area of each minute part of the stabilizing wing inside of the exceeding propeller wind after shrinking is represented by $S_{aj}$, the area of each minute part of upper stabilizing wing by $S_{0m}$, and the multiple coefficients of the vertical distances between each minute part and the center of gravity for the diameter of propeller $r_0$, are represented as $n_{Gaj}$, $n_{G0m}$. And also let $H_{aj} = S_{aj}/r_0^2$, $H_{0m} = S_{0m}/r_0^2$.

It can be considered that the total condition formula for the actual aircraft to make hovering stably is formula (26), (28) and (29). In the case of hovering of actual aircraft, there may be air flows that are over our consideration yet, but since the most basic relational formula (5), (6), (7) between propeller wind pressure $F_C$ and outside wind pressure $F_W$ is universal and fundamental natural law, even if the aircraft receives unexpected wind pressure power by special air flow, as long as the size of this kind of power is confirmed by experiment, the position of center of gravity for making the aircraft hovering stably by using formula (26), (28) and (29) can be calculated and be given so soon.

Description of Embodiment 1

In this Embodiment 1, we planned and made the propeller aircraft 60A with a delta wing where multiple $\pi$ effect is working as in FIG. 1, as to satisfy formulas (26) and (27), and we put the center of gravity of the aircraft at the calculated position, and made it hovering. The result was that this aircraft showed very stable hovering.

Propeller aircraft 60A in this Embodiment is, as FIG. 1, mainly comprised of the body 61 which has 2 vertical main wings 61a that are assembled as radial and parallel, and propeller 60 which is arranged on the top end of the body 61. Each main wing 61a is formed each other as plate-shape and as half trapezoid-shape with same shape and size, and the entire body of body 61 is formed as trapezoid and plate-shape (that is Delta wing). The inclination angle $\alpha$ of the dotted line drawn as inclined in each main wing is the adjusted angle with the spread of the wind (propeller wind) from propeller 60 during hovering.

Furthermore, the mark L in FIG. 1 is the length of the body 61, mark $r_0$ is the diameter of the propeller, mark d represents any distance below propeller 60, mark $r_a$, $r_W$ is the breadth of the stabilizing wing on the horizontal line located at distance d below propeller 60 inside of propeller wind and the breadth of the spreading of propeller wind, and in this case $r_a = r_W$. The mark r is also the breadth of the stabilizing wing located on the horizontal line at a distance d below propeller 60 inside of the propeller wind after shrinking. Points C, $C_p$, $C_o$, W, and G represent center points of total wind flow pressure of the aircraft, the center point of propeller wind pressure, the center point of wind pressure of front air flow of propeller, the center point of outside wind pressure, and the point of the center of gravity of the aircraft. Marks $\rho_o$, and $\rho_d$ is the air density directly under the propeller 60 and the air density at a distance d below propeller 60.

In FIG. 1, since multiple $\pi$ effect is assumed to be working, the air density by the propeller wind $\rho$ is inverse proportion against spread width of propeller wind $r_w$. Hence, the air density $\rho_d$ at any distance of d below the propeller wind is represented as $\rho_d = \rho_o (r_0/r_w)$. Then, suppose the width of the stabilizing wing is represented by r when the width of the stabilizing wing inside of the propeller wind $r_a$ is compressed from $\rho_d$ to $\rho_o$, then $\rho_d r_a = \rho_o r$ is held. And in the case of aircraft 60A in FIG. 1, $r_a = r_W$ is held and formula (3) is given.

$$r = r_a \left( \frac{r_0}{r_w} \right) = r_0 \quad (3)$$

The diagonal part of aircraft 60A in FIG. 1 is the shape of the shrunk stabilizing wing inside of the propeller wind obtained from formula (3). Then we obtain the area of this shrunk stabilizing wing Sc and the center point of the propeller wind pressure $C_p$, furthermore, the area of the entire aircraft $S_W$ and the center point of outside wind pressure W. Besides that, we obtain the area of upper stabilizing wing above propeller $S_0$ and center point of front wind pressure of propeller $C_0$, then, since the upper stabilizing wing above the propeller is receiving the wind pressure power of $1/\pi$, in order to add said area $S_0$ to the area of stabilizing wing inside of shrunk propeller wind which has multi it effect, we convert as $(1/\pi^2) S_0 = S'_0$, then the point where line segment $C_P C_0$ is divided by calculating proportionally according to the area ratio between said converted area $S'_0$ and the area of stabilizing wing after shrinking Sc, is the center point of total wind flow pressure C. Finally the center of gravity G is arranged as formula (26) is satisfied. This aircraft itself controls the attitude naturally against the rolling during hovering, then the pilot only controls the rotations of propeller.

Description of Embodiment 2

Figure 7:
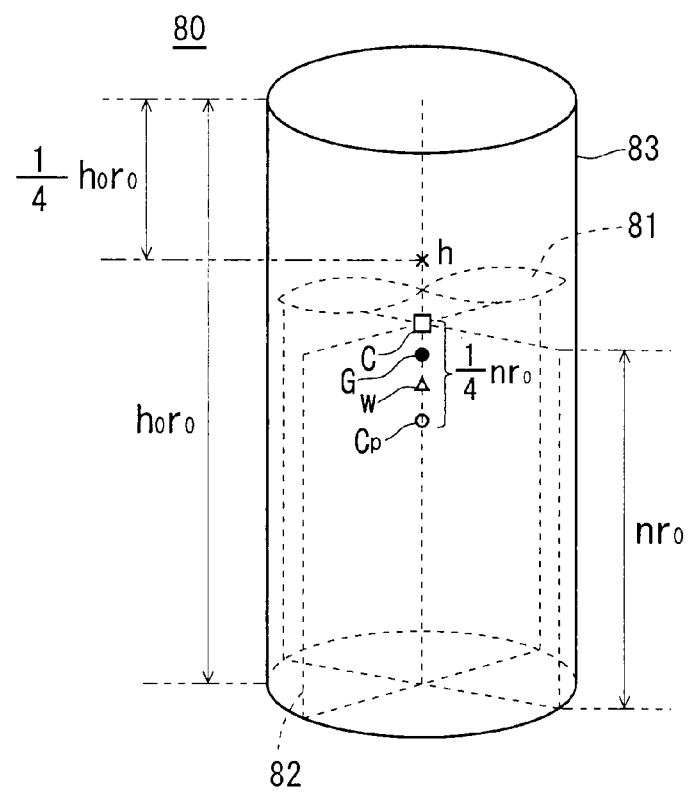
FIG. 7 is an example of perspective view of the aircraft which comprises cylindrical stabilizing wing and radial stabilizing wing.

Here we study how we should do to apply said conditional formula for stabilizing (26), (28) and formula (29) into the aircraft with multiple stabilizing wings, composed of cross stabilizing wing and cylindrical stabilizing wing in FIG. 7.

The aircraft 80 in FIG. 7 comprises propeller 81, and the stabilizing wing which is arranged under propeller 81 and which is rectangle shape viewed from the side, for example the cross shape radial stabilizing wing of lower part 82, and cylindrical stabilizing wing 83 which is arranged as surrounding the radial stabilizing wing of lower part 82 and propeller 81 on the coaxial line, and its lower end is extended at the same height as the radial stabilizing wing of lower part 82 and its top end is extended upper side than propeller 81, and driving part (not drawn) arranged at the radial stabilizing wing of lower part 82.

When cylindrical stabilizing wing 83 is arranged like aircraft 80, since the propeller wind is not spread, multiple π effect is working. Also it is clear that the air flow inside of the cylinder is parallel flow, and the center point of wind flow pressure h of the inside wall of the cylindrical stabilizing wing 83 for the wind flow inside of cylinder appears at the point removed below from the top end of the cylindrical stabilizing wing 83 by ¼ length ho $r_0$ of the cylindrical stabilizing wing 83. $r_0$ is diameter of propeller. Also the center point of wind flow pressure $C_p$ of the lower cross stabilizing wing 82 for the wind flow inside of cylinder appears at the point removed below from the top end of the lower cross stabilizing wing 82 by ¼ height n $r_0$ of the lower cross stabilizing wing 82. And then, the point obtained by dividing proportionally the segment line $hC_p$ according to the ratio of the size of two wind pressure powers that appear at these two center point of wind flow pressures, is the center point of total wind flow pressure C. Point W is the center point of outside wind pressure, and the center of gravity G for the aircraft 80 to make stable hovering is the point obtained by dividing proportionally the segment line CW as formula (26) is satisfied.

Now, we study how much size of propeller wind pressure is applied to the inside wall of the cylindrical stabilizing wing 83.

Figure 8:
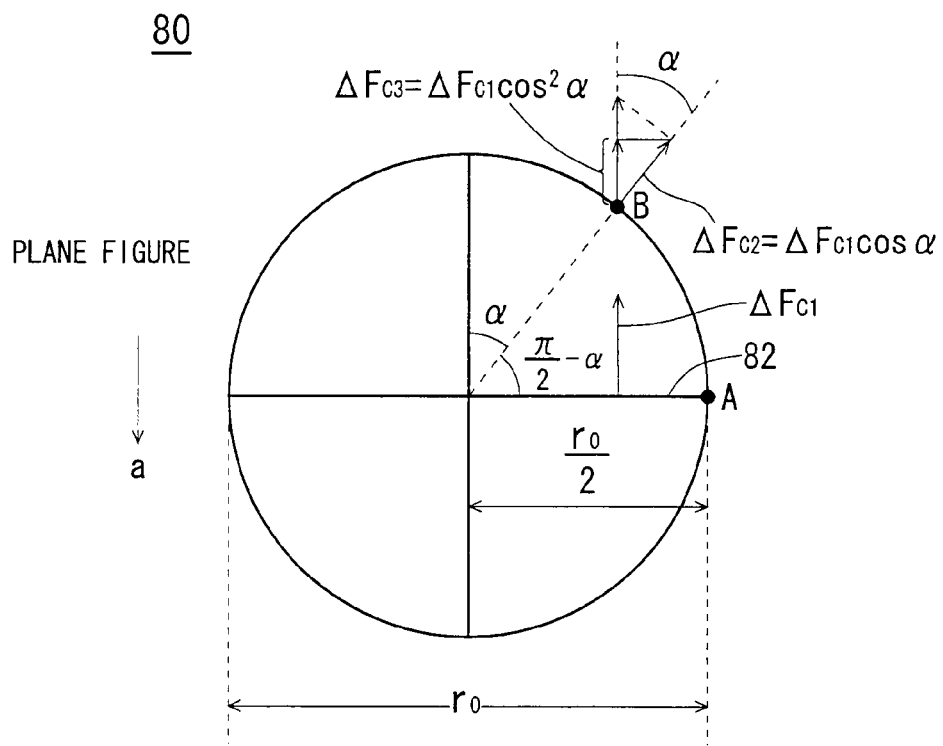
FIG. 8 is a plane figure of the aircraft 80 in FIG. 7, which is for calculating the wind pressure power that comes from the wind flow of the inside of the cylinder and that is applied to the inside wall of the cylindrical stabilizing wing.

FIG. 8 is the view of aircraft 80 from upper side (driving parts such as propeller are not drawn). But the diameter of the circle is the length given by shrinking the inside diameter of the cylindrical stabilizing wing into propeller diameter $r_0$. Now, suppose that aircraft 80 begins to move at acceleration a to downside in FIG. 8. At this moment let the wind pressure power that per unit area of the cross stabilizing wing 82 receives from the wind flow of inside of cylinder be $\Delta F_{C1}$, the power that the inside wall of the cylinder at point B which advanced counterclockwise at any angle (π/2)·α along the circumference from point A which is on the cross stabilizing wing 82 in FIG. 8, is receiving vertically on its inside wall, becomes $\Delta F_{C2} = \Delta F_{C1} \cos \alpha$ according to FIG. 8, and the vertical element of $\Delta F_{C2}$ becomes $\Delta F_{C3} = \Delta F_{C1} \cos^2 \alpha$. And when this $\Delta F_{C1} \cos^2 \alpha$ is integrated along the circumference of inside cylinder in FIG. 8, it becomes total wind pressure power $\Delta F_{C\phi}$ that circumference of inside wall of the cylinder is receiving from the wind flow of inside cylinder, the size of it is formula (30).

$$\Delta F_{C\phi} = \frac{\pi}{2} r_0 \Delta F_{C1} \quad (30)$$

It becomes clear, according to formula (30), that the wind pressure power $F_{C\phi}$ that inside wall of cylindrical stabilizing wing is receiving from the inside flow of the cylinder, is π/2 of the wind pressure power $F_C$ that one piece of flat plate stabilizing wing (the flat plate stabilizing wing that is the same shape and size as the shadow of the inside wall of the cylindrical stabilizing wing when it is projected) which is the same width as inside diameter of cylindrical stabilizing wing and is the same length as cylindrical stabilizing wing, is receiving from the wind flow of inside of cylinder $$F_{C\phi} = \frac{\pi}{2} F_C = H_C \left(\frac{\pi^2}{2}\right) F_P \sin\beta \quad (31)$$

We calculated the wind pressure power from the wind flow of inside of the cylinder to the cylindrical stabilizing wing in FIG. 8, following the formula (31), and obtained the center point of total wind flow pressure C of entire aircraft 80, and obtained the point between point C and the center point of outside wind pressure W that satisfied the formula (26), and put the center of gravity on the point and made the aircraft 80 hovering. The aircraft 80 could make very stable hovering like the aircraft 60A in FIG. 1. Of course at that time, it went without saying that the aircraft itself could control the attitude naturally against the swaying in all directions, and the pilot did only the control of propeller revolution.

The aircraft 80 comprises cross stabilizing wing. Since this cross stabilizing wing was needed for installing the driving part of propeller and for installing the cylindrical stabilizing wing as accurately as possible, it became such aircraft with multiple stabilizing wing composed of cross stabilizing wing and cylindrical stabilizing wing as in FIG. 7. The purpose of the experiment was to obtain how much wind pressure the propeller wind gave towards cylindrical stabilizing wing. As a result, the purpose of the experiment was achieved, and in the case that the aircraft which comprises only cylindrical stabilizing wing, the conditional formula for stabilizing hovering, formula (26), formula (28) are given as below. The formula (26) is as below.

$$[H]n_{GC} = [W]n_{GW} \quad (26)$$

Provided $$[H] = \frac{\pi^2}{2} H_D \quad (32)$$

$$[W] = \frac{S_W}{[S_C]} \quad (25)$$

$$[S_C] = \frac{\pi}{2} S_D \quad (33)$$

Let $H_D = S_D/r_0^2$, and also let $S_D$ be projection area of inside wall when inside diameter of cylindrical stabilizing wing is shrunk into diameter of propeller $r_0$.

Formula (28) becomes formula (34).

$$\frac{\pi^2}{2} \sum_q H_{Dq} n_{GDq} + \frac{[W]}{S_W} \sum_k S_{W,k} n_{GWk} \geq n_G \quad (34)$$

Provided $$[W] = \frac{S_W}{[S_C]} \quad (25)$$

$$[S_C] = \frac{\pi}{2} S_D \quad (33)$$

Let $H_{Dq} = S_{Dq}/r_0^2$, and let $S_{Wk}$ be the area of each minute part of projection area $S_W$ of entire aircraft, let $S_{Dq}$ be the area of each minute part of said $S_D$, and let $n_{Gdq}$, $n_{GWk}$ be multiple coefficient of the vertical distance between each minute part that has the area of said each $S_{Dq}$, $S_{Wk}$ and the center of gravity of the aircraft for the diameter of propeller $r_0$.

Incidentally, for said aircraft with multiple stabilizing wing in FIG. 7, since multiple π effect is working, said conditional formula (26) and formula (28) becomes as follows.

$$[H]n_{GC} = [W]n_{GW} \quad (26)$$

Provided $$[H] = \pi(H_C + H_a) + \frac{1}{\pi}H_0 + \frac{\pi^2}{2}H_D \quad (35)$$

$$[W] = \frac{S_W}{[S_C]} \quad (25)$$

$$[S_C] = S_C + S_a + \frac{1}{\pi^2}S_0 + \frac{\pi}{2}S_D \quad (36)$$

$$H_D = \frac{S_D}{r_0^2} \quad (37)$$

(And in the case of FIG. 7, $H_a = H_0 = S_a = S_0 = 0$)

$$\pi \sum_i H_{Ci} n_{GCi} + \pi \sum_j H_{aj} n_{Gaj} + \frac{1}{\pi} \sum_m H_{0m} n_{G0m} + \frac{\pi^2}{2} \sum_q H_{Dq} n_{GDq} + \frac{[W]}{S_W} \sum_k W_{Wk} n_{GWk} \geq n_G \quad (38)$$

Provided $$[W] = \frac{S_W}{[S_C]} \quad (25)$$

$$[S_C] = S_C + S_a + \frac{1}{\pi^2}S_0 + \frac{\pi}{2}S_D \quad (36)$$

$$H_{Dq} = \frac{S_{Dq}}{r_o^2} \quad (39)$$

(And in the case of FIG. 7, $H_{aj} = H_{0m} = S_a = S_0 = 0$)

As we see formulas (35), (36), and (38), the section related to cylindrical stabilizing wing is simply added to each conditional formula of radial stabilizing wing (21), (23), and (28). Although the form of formula (26) does not change in all condition, only the value of the marks [H], [W], [$S_C$], change according to the shape, condition of the aircraft as mentioned before.

In Description of Embodiment 1, the example of practicing of radial stabilizing wing was shown, in this Embodiment 2, the example of practicing of multiple stabilizing wing composed of radial stabilizing wing and cylindrical stabilizing wing was shown, and at the same time the example of cylindrical stabilizing wing alone was shown. In actual scene, it seems that said multiple stabilizing wing will be often used for increasing the stability of the aircraft.

In contrast with that, there are 2 kinds of conditions due to the condition that multiple π effect works or does not work on the radial stabilizing wing as mentioned before, usually, multiple π effect always works in the cylindrical stabilizing wing whatever high the height of the cylindrical stabilizing wing may be. By combining these 2 kinds of stabilizing wings, it becomes possible to create the aircraft that can make more stable hovering.

The conditional formula for stable hovering of the aircraft composed of these 2 stabilizing wings, when multiple π effect is working on both stabilizing wings, was described by [formula (26), formula (35), formula (25), formula (36), formula (37)], [formula (38), formula (25), formula (36), formula 39)], but when multiple π effect works only on cylindrical stabilizing wing, as described in the postscript of said [formula (26), formula (35), formula (25), formula (36), formula (37)], [formula (38), formula (25), formula (36), formula (39)], the form of formula (26) did not change, and was simply to add the section related to cylindrical stabilizing wing to formula (22), formula (24), formula (29). For reference, these formulas are listed below.

$$[H] n_{GC} = [W] n_{GW} \quad (26)$$

Provided $$[H] = H_C + H_a + \frac{1}{\pi}H_0 + \frac{\pi^2}{2}H_D \quad (40)$$

$$[W] = \frac{S_W}{[S_C]} \quad (25)$$

$$[S_C] = S_C + S_a + \frac{1}{\pi}S_0 + \frac{\pi^2}{2}S_D \quad (41)$$

$$H_D = \frac{S_D}{r_0^2} \quad (37)$$

$$\sum_i H_{Ci} n_{GCi} + \sum_j H_{aj} n_{Gaj} + \frac{1}{\pi} \sum_m H_{0m} n_{G0m} + \frac{\pi^2}{2} \sum_q H_{Dq} n_{GDq} + \frac{[W]}{S_W} \sum_k S_{Wk} n_{GWk} \geq n_G \quad (42)$$

Provided $$[W] = \frac{S_W}{[S_C]} \quad (25)$$

$$[S_C] = S_C + S_a + \frac{1}{\pi}S_0 + \frac{\pi^2}{2}S_D \quad (41)$$

$$H_{Dq} = \frac{S_{Dq}}{r_o^2} \quad (39)$$

As above, two kinds of Embodiments, Embodiment 1 and Embodiment 2, were described, but this invention should not be limited within these two kinds of Embodiments.

For example, such connected aircrafts comprising two or more of the same aircrafts in any one of Embodiment 1 or Embodiment 2, which are arranged at intervals with center axes thereof being parallel to each other, and each has upwardly directed intake, and besides each aircraft is connected to each other with the connecting member like a stick at a level to ignore the projection area for example, are also included in Embodiments.

The most basic matter for the aircraft to make stable hovering is to arrange the center of gravity of the aircraft under the thrust working point, and besides, as in FIG. 1, FIG. 7, to put the center of gravity G, the center point of total wind flow pressure C, and the center point of outside wind pressure W, on the center line of the aircraft on the straight. If this is considered, the structure of said connected aircraft needs to be the structure wherein each aircraft can make stable hovering alone, and besides wherein the multiple and completely same aircrafts as above are connected. By making this structure, it can be possible to place the total center of gravity G of the entire said connected aircraft, the center point of total wind flow pressure C, and the center point of total outside wind pressure W, on the total center line of the aircraft on the straight. Suppose the whole of said connected aircraft is as one aircraft, of course, formula (26) and formula (28), or formula (29), or formula (34), or formula (38) holds.

The experiment related to said connected aircraft was proceeded by connecting 2 aircrafts 80 in FIG. 7. We designed the aircraft as formula (26) and formula (38) were held, put the center of gravity of the aircraft at the designed place, and when we made the connected aircraft hovering, the aircraft showed excellent stable hovering.

The invention claimed is:

1. A flying object, comprising:
   a wind flow generating device; and
   one or more radial stabilizing wings arranged along a center axis of a wind flow in the form of a coaxial line in a wind flow generated by the wind flow generating device,
   wherein said radial stabilizing wings are arranged such that a relationship between a vertical distance $n_{GC}$ between a center point of total wind flow pressure obtained by synthesizing a center point of wind flow pressure of the respective stabilizing wings and a center of gravity of the flying object, and a vertical distance $n_{GW}$ between a center point of outside wind pressure and the center of gravity of the flying object, is represented by formula (26), wherein:

$$[H]n_{GC} = [W]n_{GW} \tag{26}$$

providing that:

$$[H] = \pi(H_C + H_a) + \frac{1}{\pi}H_0 \tag{21}$$

$$[W] = \frac{S_W}{[S_C]} \tag{25}$$

$$[S_C] = S_C + S_a + \frac{1}{\pi^2}S_0 \tag{23}$$

$$H_C = \frac{S_C}{r_0^2}, \ H_a = \frac{S_a}{r_0^2}, \ H_0 = \frac{S_0}{r_0^2} \tag{43}$$

where,
   $r_0$: a diameter of the wind flow generating device;
   $S_C$: an area obtained by converting an area of said radial stabilizing wing inside of a spreading wind flow generating device wind into an area of said radial stabilizing wing inside of a shrunk wind flow generating device wind, when the spreading wind flow generating device wind is shrunk such that the wind flow generating device wind flows as a parallel wind flow without changing an air density directly under wind flow generating device, but a calculation of shrinking rate is as follows:
   a horizontal line on said radial stabilizing wing located at any distance from the wind flow generating device, and a width of spreading of the wind flow generating device wind on its horizontal line be $r_W$, a width of said radial stabilizing wing inside of the wind flow generating device wind be $r_a$, and the width of said radial stabilizing wing on its horizontal line after shrinking be r, and r is represented by formula (3), in which $$r = r_a\left(\frac{r_0}{r_w}\right) \tag{3}$$

$S_a$: the area of said radial stabilizing wing inside of exceeding part of the shrunk wind flow generating device wind when the area of said radial stabilizing wing inside of the exceeding wind flow generating device wind from inside of said spreading wind flow generating device wind is shrunk at a shrinking rate represented by formula (3), and in which
   $S_0$: the area (except the area where the wind flow generating device wind is flowing) of said radial stabilizing wing of the wind flow generating device periphery, and
   $S_W$: a projection area of the flying object.

2. The flying object described in claim 1, wherein a stable hovering condition is $$\pi\sum_i H_{Ci}n_{GCi} + \pi\sum_j H_{aj}n_{Gaj} + \frac{1}{\pi}\sum_m H_{0m}n_{G0m} + \frac{[W]}{S_W}\sum_k S_{Wk}n_{GWk} \geq n_G \tag{28}$$

providing that:

$$[W] = \frac{S_W}{[S_C]} \tag{25}$$

$$[S_C] = S_C + S_a + \frac{1}{\pi^2}S_0 \tag{23}$$

$$H_{Ci} = \frac{S_{Ci}}{r_0^2}, \ H_{aj} = \frac{S_{aj}}{r_o^2}, \ H_{om} = \frac{S_{om}}{r_0^2} \tag{44}$$

where,
   $r_0$: the diameter of the wind flow generating device,
   $S_C$: the area obtained by converting the area of said radial stabilizing wing inside of the spreading wind flow generating device wind into the area of said radial stabilizing wing inside of the shrunk wind flow generating device wind, when the spreading wind flow generating device wind is shrunk such that the wind flow generating device wind flows as the parallel wind flow without changing the air density directly under the wind flow generating device, but the calculation of shrinking rate is as follows:
   the horizontal line on said radial stabilizing wing located at any distance from the wind flow generating device, and the width of spreading of the wind flow generating device wind on its horizontal line be $r_E$, the width of said radial stabilizing wing inside of the wind flow generating device wind be $r_a$, and the width of said radial stabilizing wing on its horizontal line after shrinking be r, then r is represented by formula (3), in which $$r = r_a\left(\frac{r_0}{r_w}\right) \tag{3}$$

$S_a$: the area of said radial stabilizing wing inside of exceeding part of the shrunk wind flow generating device wind when the area of said radial stabilizing wing inside of the exceeding wind flow generating device wind from inside of said spreading wind flow generating device wind is shrunk at the shrinking rate represented by formula (3), and in which
   $S_0$: the area (except the area where the wind flow generating device wind is flowing) of said radial stabilizing wing of the wind flow generating device periphery,
   $S_W$: the projection area of the flying object,
   $S_{Ci}$: an area of each minute part of said $S_C$,
   $S_{aj}$: an area of each minute part of said $S_a$, $S_{0m}$: an area of each minute part of said $S_0$,
$S_{Wk}$: an area of each minute part of said $S_W$,
$n_G$: a first multiple coefficient of a vertical distance between a fixed point of a rotational axis of the wind flow generating device and the center of gravity of the flying object for the diameter of the wind flow generating device $r_0$,
$n_{GCi}$: a second multiple coefficient of a vertical distance between each minute part that has the area of said $S_{Ci}$ and the center of gravity of the flying object for the diameter of the wind flow generating device $r_0$,
$n_{Gaj}$: a third multiple coefficient of a vertical distance between each minute part that has the area of said $S_{aj}$ and the center of gravity of the flying object for the diameter of the wind flow generating device $r_0$,
$n_{G0m}$ a fourth multiple coefficient of a vertical distance between each minute part that has the area of said $S_{0m}$ and the center of gravity of the flying object for the diameter of the wind flow generating device $r_0$, and
$n_{GW}k$: a fifth multiple coefficient of a vertical distance between each minute part that has the area of said $S_{Wk}$ and the center of gravity of the flying object for the diameter of the wind flow generating device $r_0$.

3. The flying object of claim 2, wherein the flying object has a cross shape stabilizing wing and a cylindrical stabilizing wing and the wings share one wind flow generating device.

4. The flying object of claim 3, further comprising two or more flying objects which are arranged at intervals with center axes thereof being parallel to each other and each has a upwardly directed intake and a downwardly direct exhaust; and
a connecting member connecting said two or more flying objects to each other.

5. The flying object of claim 2, further comprising two or more flying objects which are arranged at intervals with center axes thereof being parallel to each other and each has a upwardly directed intake and a downwardly direct exhaust; and
a connecting member connecting said two or more flying objects to each other.

6. The flying object of claim 1, wherein the flying object has a cross shape stabilizing wing and a cylindrical stabilizing wing and the wings share one wind flow generating device.

7. The flying object of claim 6, further comprising two or more flying objects which are arranged at intervals with center axes thereof being parallel to each other and each has a upwardly directed intake and a downwardly direct exhaust; and
a connecting member connecting said two or more flying objects to each other.

8. The flying object of claim 1, further comprising two or more flying objects which are arranged at intervals with center axes thereof being parallel to each other and each has a upwardly directed intake and a downwardly direct exhaust; and
a connecting member connecting said two or more flying objects to each other.

9. A flying object, comprising:
a wind flow generating device; and
one or more cylindrical stabilizing wings arranged along a center line of a wind flow in the shape of coaxial line in a wind flow generated by concerned wind flow generating device,
wherein said cylindrical stabilizing wings are arranged such that a relationship between a vertical distance $n_{GC}$ between a center point of total wind flow pressure obtained by synthesizing a center point of wind flow pressure of the respective stabilizing wings and a center of gravity of concerned flying object, and a vertical distance $n_{GW}$ from a center point of outside wind pressure and a center of gravity of the flying object, is represented by formula (26), wherein $$[H]n_{GC} = [W]n_{GW} \quad (26)$$

providing that:

$$[H] = \frac{\pi^2}{2} H_D \quad (32)$$

$$[W] = \frac{S_W}{[S_C]} \quad (25)$$

$$[S_C] = \frac{\pi}{2} S_D \quad (33)$$

$$H_D = \frac{S_D}{r_0^2} \quad (37)$$

where;
$r_0$: a diameter of the wind flow generating device,
$S_D$: a projection area of inside wall when inside diameter of cylindrical stabilizing wing is shrunk into the diameter of the wind flow generating device,
$S_W$: a projection area of the flying object.

10. The flying object described in claim 9, wherein a stable hovering condition is $$\frac{\pi^2}{2} \sum_q H_{Dq} n_{GDq} + \frac{[W]}{S_W} \sum_k S_{Wk} n_{GWk} \geq n_G \quad (34)$$

providing that:

$$[W] = \frac{S_W}{[S_C]} \quad (25)$$

$$[S_C] = \frac{\pi}{2} S_D \quad (33)$$

$$H_{Dq} = \frac{S_{Dq}}{r_o^2} \quad (39)$$

where;
$r_0$: the diameter of the wind flow generating device,
$S_W$: the projection area of the flying object,
$S_D$: the projection area of inside wall when inside diameter of cylindrical stabilizing wing is shrunk into the diameter of the wind flow generating device,
$S_{Wk}$: an area of each minute part of said $S_W$,
$S_{Dq}$: the arc an area of each minute part of said $S_D$,
$n_G$: a first multiple coefficient of a vertical distance between a fixed point of a rotational axis of the wind flow generating device and the center of gravity of the flying object for the diameter of the wind flow generating device $r_0$,
$n_{GW}k$: a second multiple coefficient of a vertical distance between each minute part that has the area of said $S_{Wk}$ and the center of gravity of the flying object for the diameter of the wind flow generating device $r_0$,
$n_{GDq}$: a third multiple coefficient of a vertical distance between each minute part that has the area of said $S_{Dq}$ and the center of gravity of the flying object for the diameter of the wind flow generating device $r_0$.

11. The flying object of claim 10, wherein the flying object has a cross shape stabilizing wing and a cylindrical stabilizing wing and the wings share one wind flow generating device.

12. The flying object of claim 11, further comprising two or more flying objects which are arranged at intervals with center axes thereof being parallel to each other and each has a upwardly directed intake and a downwardly direct exhaust; and a connecting member connecting said two or more flying objects to each other.

13. The flying object of claim 10, further comprising two or more flying objects which are arranged at intervals with center axes thereof being parallel to each other and each has a upwardly directed intake and a downwardly direct exhaust; and a connecting member connecting said two or more flying objects to each other.

14. The flying object of claim 9, wherein the flying object has a cross shape stabilizing wing and a cylindrical stabilizing wing and the wings share one wind flow generating device.

15. The flying object of claim 14, further comprising two or more flying objects which are arranged at intervals with center axes thereof being parallel to each other and each has a upwardly directed intake and a downwardly direct exhaust; and a connecting member connecting said two or more flying objects to each other.

16. The flying object of claim 9, further comprising two or more flying objects which are arranged at intervals with center axes thereof being parallel to each other and each has a upwardly directed intake and a downwardly direct exhaust; and a connecting member connecting said two or more flying objects to each other.

* * * * *

UNITED STATES PATENT AND TRADEMARK OFFICE
CERTIFICATE OF CORRECTION

| | | |
|---|---|---|
| PATENT NO. | : 9,016,616 B2 | Page 1 of 1 |
| APPLICATION NO. | : 13/190040 | |
| DATED | : April 28, 2015 | |
| INVENTOR(S) | : Hiroshi Kawaguchi | |

It is certified that error appears in the above-identified patent and that said Letters Patent is hereby corrected as shown below:

On the title page, under Inventor; Delete "(76)", and insert --(75)--.

On the title page, Item (73), the Assignees' Information has been omitted. Item (73) should read:

--(73) Assignees: Hiroshi Kawaguchi, Habikino-shi (JP);
                  Yasuko Kawaguchi, Habikino-shi (JP);
                  Syuichi Kawaguchi, Habikino-shi (JP);
                  Megumi Kawaguchi, Habikino-shi (JP);
                  Sachiko Kawaguchi, Habikino-shi (JP)--.

Signed and Sealed this
Eighth Day of September, 2015

Michelle K. Lee
*Director of the United States Patent and Trademark Office*